United States Patent [19]

Weiss et al.

[11] Patent Number: 4,572,342

[45] Date of Patent: Feb. 25, 1986

[54] TORQUE-LIMITING CLUTCH

[75] Inventors: Hermann Weiss; Rudolf Weiss, both of Vreden, Fed. Rep. of Germany

[73] Assignee: ATEC-Weiss KG, Vreden, Fed. Rep. of Germany

[21] Appl. No.: 550,524

[22] Filed: Nov. 9, 1983

[30] Foreign Application Priority Data

Nov. 12, 1982 [DE] Fed. Rep. of Germany ....... 3241914

[51] Int. Cl.⁴ .............................................. F16D 7/06
[52] U.S. Cl. ................................ 192/56 R; 192/89 A; 192/150
[58] Field of Search .................... 192/56 R, 89 A, 150; 464/36

[56] References Cited

U.S. PATENT DOCUMENTS 2,045,086 6/1936 Kastner ............................. 192/56 R
4,467,902 8/1984 Girguis ............................. 192/56 R

FOREIGN PATENT DOCUMENTS 1220210 6/1966 Fed. Rep. of Germany .... 192/56 R
1284182 11/1968 Fed. Rep. of Germany .... 192/56 R Primary Examiner—A. Michael Chambers
Assistant Examiner—John C. Fox
Attorney, Agent, or Firm—Sprung Horn Kramer & Woods

[57] ABSTRACT

The invention relates to a torque-limiting clutch. An engagement lock (2, 8, 9, 11, 12) and a friction clutch (6, 20–26) disengageable counter to the force of an axially acting spring are arranged in series in the force transmission path between the drive side (1) and the power take-off side (26) of the clutch. The engagement lock (2, 8, 9, 11, 12) is stressed by a second spring which, when the engagement lock has been disengaged, acts on a first portion of the adjustment travel only. Assigned to the locking device (9) of the engagement lock (2, 8, 9, 11, 12) is an ascending curve, the steepness of which is greater over the first portion of the adjustment travel than over the portion adjoining the latter. In this clutch, the limiting torque is determined solely by the second spring. Whereas the steepness of the first portion is chosen so that the engagement lock reacts after the limiting torque, the steepness of the second portion can be chosen, taking into account the two springs which are then activated simultaneously, so that the clutch can be disengaged easily and quickly.

8 Claims, 7 Drawing Figures

TORQUE-LIMITING CLUTCH

BACKGROUND OF THE INVENTION

The invention relates to a torque-limiting clutch with two clutch halves disengageable counter to the force of an axially acting spring, and with an engagement lock which is located in the force transmission path and consists of two parts held in engagement via a spring-loaded engagement means and of which the part which is disengageable and adjustable axially when the limiting torque is exceeded acts on the adjustable clutch half.

Clutches of this type are known. In a known clutch of this type (German Utility Model No. 7,243,689), the engagement lock is held engaged by means of the spring which stresses the slipping clutch. So that the slipping clutch does not slip through before the engagement lock has reacted, the slipping clutch should be subjected to as high a spring force as possible. However, the pressure to which the engagement lock is subjected must be governed by the limiting torque which can be transmitted. So that both requirements can be met at the same time, a compromise must be found for the spring which simultaneously stresses the engagement lock and the slipping clutch. Consequently, it is not possible at the same time to adjust both the engagement lock and the slipping clutch in the most efficient way.

SUMMARY OF THE INVENTION

The object on which the invention is based is to provide a slipping clutch, by means of which it is possible to adjust the limiting torque without taking into account the adjustment of the clutch.

This object is achieved, according to the invention, when the engagement lock is stressed by a further spring which, when the engagement lock has been disengaged, acts on a first portion of the adjustment travel of the adjustable part only, there being assigned to the locking device of the engagement lock an ascending curve, the steepness of which is greater over the first portion of the adjustment travel than over the portion adjoining the latter.

Because individual springs are used for the clutch and the engagement lock and because of the special design of the ascending curve, it becomes possible for the limiting torque to be adjusted completely independently of the adjustment of the clutch. Only when the engagement lock has reacted, that is to say when the engagement means has overcome the first portion of the adjustment travel counter to the effective force of the first spring, is the second spring activated. By selecting the inclination of the second portion of the ascending curve, it is possible to determine the torque required for releasing the clutch. In the limiting case, it is possible to make the inclination over the second portion so flat that in spite of the two springs acting simultaneously the torque for further adjustment up to the release of the clutch is less than that over the first portion during disengagement.

According to a first embodiment of the invention, the clutch half connected fixedly in terms of rotation to the axially adjustable part of the engagement lock consists of two parts which clamp the other clutch half between them by means of the force of the spring and one part of which is axially non-displaceable and serves as an abutment for the spring supporting the other part. In this embodiment, as is known per se, the force of a spring or of a spring assembly is utilized to generate a pressing force on the two sides of the other clutch half which are located opposite one another.

To guarantee that when the clutch is not released the other clutch half rests against the one clutch half by means of the two sides located opposite one another, and when the brake is lifted the other clutch half is also lifted off from the axially fixed part of the one clutch half, it is envisaged that there should act on the other clutch half in the lifting direction a further spring, the spring force of which is less than the force of the spring of the one clutch half, which acts in the opposite direction. Furthermore, the axial mobility of the other clutch half should be limited by means of a stop to a play which is less than the total lifting play between the two parts of the one clutch half. This ensures that when the clutch is released the other clutch half does not slip on either of its two sides located opposite one another.

Since the engagement lock and the clutch are arranged, connected in series, in the force transmission path between the drive and the power take-off and since the engagement lock acts only as a releasing means for the clutch, it is not necessary for the two parts of the engagement lock to be capable of rotating freely relative to one another after the engagement lock has reacted, but on the contrary the angle of rotation of the two parts of the engagement lock relative to one another is preferably limited by stops. In this embodiment, one part need be turned back only slightly so as to assume the engagement position again. For the purpose of engaging the engagement lock, a switching ring is preferably arranged so as to be non-rotatable and axially displaceable on one part of the engagement lock and has a switch point which interacts with a nose on the other part of the engagement lock in such a way that the other disengaged part is guided back into the engagement position as a result of the axial displacement of the switching ring.

In order, under specific operating conditions in which very high torques can arise, for example in the direct cutting in of squirrel-cage induction motors, to prevent the clutch adjusted for lower torques from reacting, according to one embodiment of the invention the switch point of the switching ring has such a recess for receiving the nose on the other part of the engagement lock that the switching ring and the other part are interlocked positively in the axially displaced position of the former and in the direction of rotation of the latter.

By means of these embodying features, the interlocking of the switching ring and the other part of the engagement lock is effected, for example, before the direct cutting in of squirrel-cage induction motors. After the drive has started up, the interlock is cancelled again, so that the overload clutch can react in response to its limiting torque.

To keep the release of the engagement lock substantially free of frictional influences, the locking device should be a ball or roller mounted so as to be freely rotatable.

The invention is explained in more detail below with reference to a drawing which illustrates an exemplary embodiment and in which in particular:

DETAILED DESCRIPTION OF THE INVENTION

Figure 1:
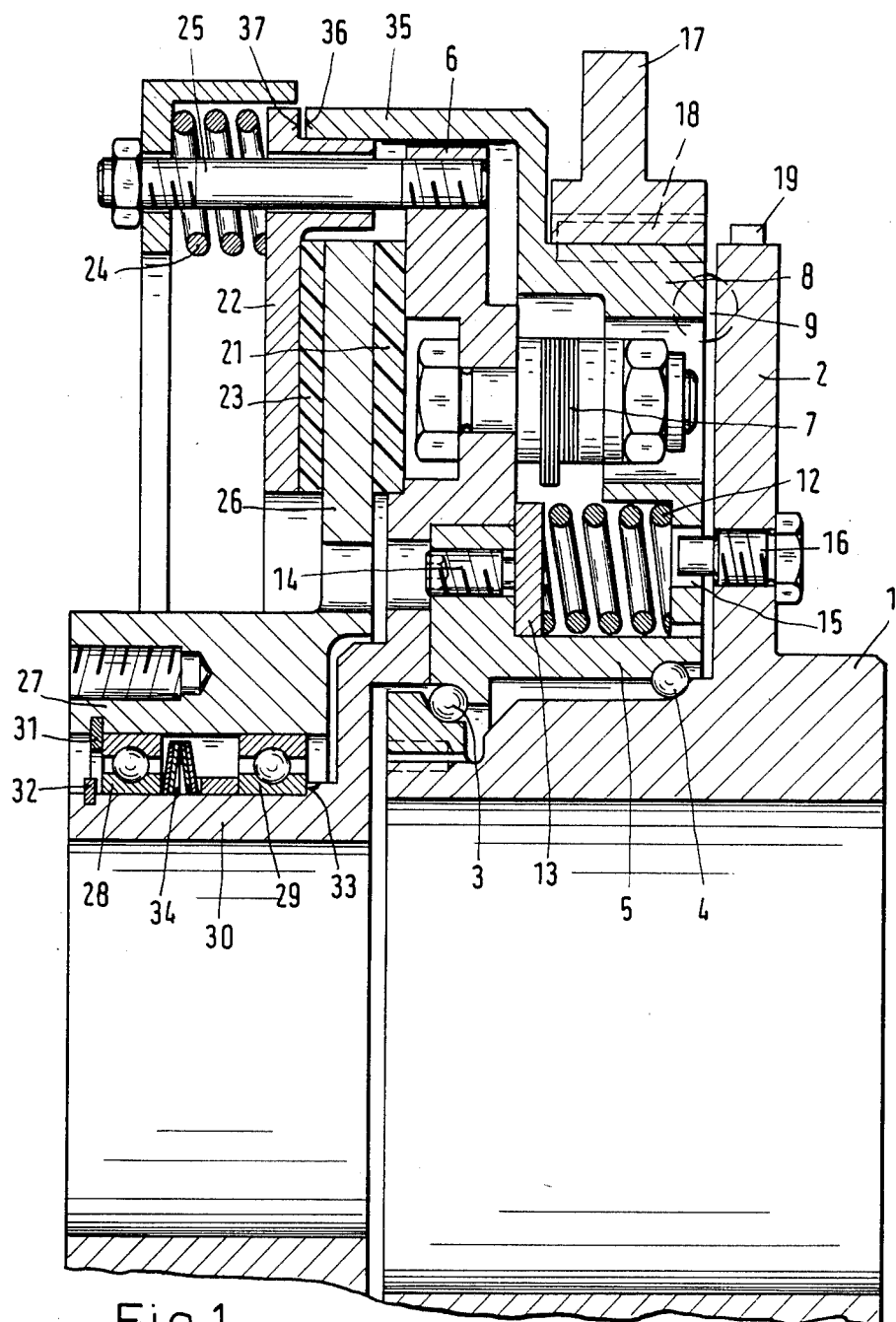
FIG. 1 shows a torque-limiting clutch in a half axial section.
Figure 2:
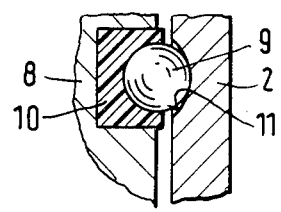
FIG. 2 shows an axial section of the clutch according to FIG. 1 in the region of the engagement lock.

A disk 2 designed, for example, as a ring is made in one piece with a hub 1 which can be coupled to a drive. A sleeve 5 is mounted on the hub 1 so as to be rotatable, but non-displaceable axially by means of ball bearings 3, 4. Connected firmly to the sleeve 5 is a flange 6 to which a further flange 8 is fastened fixedly in terms of rotation, but so as to be axially movable, via spring-plate stacks 7 arranged in the form of a ring.

The flange 8 and the disk 2 form parts of an engagement lock. This engagement lock includes as a locking device a ball 9 which is held in a plastic mounting 10 in the disk 2. Several such locking devices 9 are provided on the periphery of the flange 8. A depression 11 in the disk 2 is assigned as an engagement means to each of these balls. The locking device 9 is retained in this engagement means 11 by means of spring force. The spring force is exerted by a spring 12 which is supported on a setting ring 13 and which subjects the flange 8 to pressure in the direction of the disk 2. The spring force of this spring 12 can be adjusted by means of regulating screws 14 located in the sleeve 5 and acting on the setting ring 13. The rotation of the two parts 2, 3 relative to one another, which is possible after the engagement lock has been released, is limited by a stop which is formed by a bolt 16 engaging with play into a recess 15 in the flange 8.

A setting ring 17 with a switch point 18, to which a nose 19 on the disk 2 is assigned, is arranged on the flange 8 fixedly in terms of rotation, but so as to be axially displaceable. The switch point 18 has an orifice which is such that it covers the maximum possible rotational travel of the two parts 2, 8. By means of a fork 20 grasping the setting ring 17, the setting ring 17 can be displaced axially in any rotational position. The fork-shaped switch point 18 has in its bottom a recess 18a which matches the form of the nose 19. When the setting ring 17 is displaced axially until the nose 19 is located in the recess 18a, the setting ring 2 and the flange 8 are interlocked positively in the direction of rotation, so that the engagement means cannot disengage.

The flange 6 carries a frictional clutch lining 21 and forms one part of a clutch half. The other part of this clutch half is formed by a flange 22 which likewise carries a clutch lining 23. This last-mentioned part 22 is subjected to pressure by a helical spring 24 which is retained by means of a screw bolt 25 on the other part 6 of the same clutch half. Located between the two parts 6, 21, 22, 23 as the other clutch half is a disk 26 which is made in one piece with a hub-shaped power take-off part 27. This power take-off part 27 is mounted via ball bearings 28, 29 so as to be rotatable and axially displaceable to a limited extent on a hub 30 connected in one piece to the flange 6. The axial movability is limited by stops 31, 32, 33 on the hubs 27, 30. A cup spring 34 between the two bearings 28, 29 subjects the hub 27 to pressure in a direction opposite to the direction of pressure of the spring 24.

Figure 3:
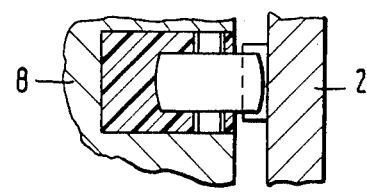
FIGS. 3 and 4 show, in axial section, alternative designs of the engagement lock.
Figure 5:
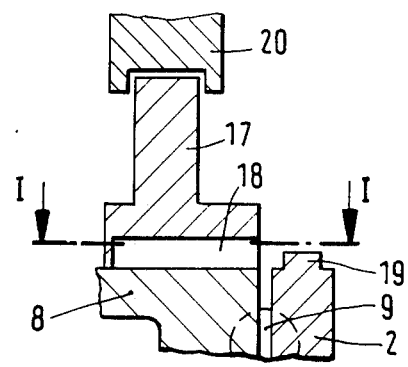
FIG. 5 shows, in axial section, an engagement means for the engagement lock.
Figure 4:
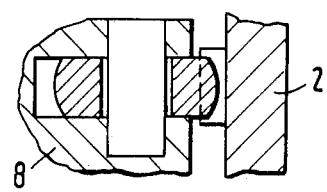
Figure 6:
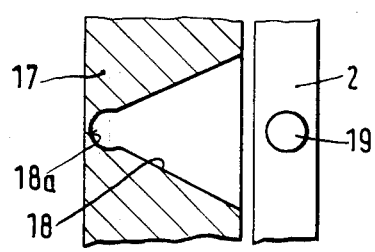
FIG. 6 shows the engagement means according to FIG. 5 in a section along the line I—I and, FIG. 7 shows part of the engagement lock according to FIG. 2 in a section along the line II—II.

Instead of designing the locking device as a ball 9, the locking device can also be designed as a roller, as shown in FIGS. 3 and 4.

Figure 7:
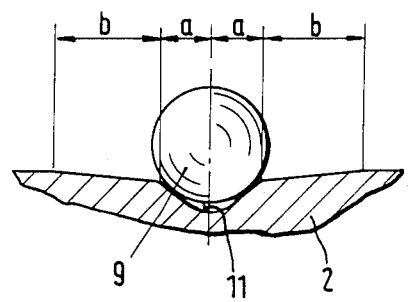

The torque-limiting clutch described works in the following way:

In the event of an overload, the hub 1 coupled to the drive rotates, together with the disk 2, relative to the flange 8. The flange 8 need be displaced only against the force of the spring 12 over the first portion a of an ascending curve formed in the disk 2 (see FIG. 7), because a pot 35 attached to the flange 8 has not yet come to rest against a collar 37 by means of its edge 36. In contrast to this, in the second portion b the force of the spring 24 also has to be overcome. So that no higher forces are necessary, the steepness of the second portion b is made less. The clutch 6, 21 to 23, 26 is released over this second portion b. As soon as the clutch 6, 21 to 23, 26 has been released, the hub 1 can rotate freely relative to the power take-off part 27. The rotation of the parts 2, 8 of the engagement lock after release has taken place is limited by the stop 15, 16.

As soon as the clutch 6, 21 to 23, 26 is released, not only is the flange 22 together with its lining 23 lifted off from the disk 26, but the disk 26 is also lifted off from the lining 21 of the other flange 6 of the clutch half, specifically because the cup spring 34 displaces the hub 27, together with the disk 26, until the bearing 28 comes to rest against the stop 31.

When the clutch is then to be engaged again, it is merely necessary to displace the setting ring 17 axially. The nose 19 is grasped by the switch point 18 and, during further displacement, the part 2 is turned back relative to the part 8, so that the locking device 9 can engage again. The result of the associated axial displacement of the flange 8 under the effect of the helical spring 12 is that the clutch 6, 20 to 23, 26 is also engaged again under the effect of the helical spring 24.

If it is not desirable for the clutch to react when the limiting torque is exceeded, the setting ring 17 is displaced axially until the nose 19 is located in the recess 18a. Since the lateral flanks of the recess 18a are perpendicular to the direction of the effective torque, the torque is transmitted by the flange 2 via the nose 19 and the recess 18a to the flange 8. The flux of force which otherwise occurs via the engagement means 9 is consequently diverted so that the engagement lock cannot react when the limiting torque is exceeded.

The advantages achieved by means of the invention are that the clutch reacts very quickly in the event of an overload. Since the engagement lock acts as a releasing means, but the clutch is a friction or spur-gear clutch which is fully disconnected after being released, only slight frictional forces have to be overcome during release, and after release the overload clutch is effective for as long as desired, without any wear or other loading of the clutch being involved. Also, the clutch can be engaged again easily and quickly from outside.

We claim:

1. A torque-limiting clutch comprising: a hub; two clutch halves including one axially movable clutch half; a spring forcing the two clutch halves into engagement; an engagement lock disposed between the hub and one clutch half forming a force transmission path and comprising two parts held in engagement by spring loaded engagement means and means mounting one part for axial adjustment when a limiting torque acting on the hub is exceeded, the mounting means comprising a locking device between the two parts and a path of travel for the locking device having an ascending curve with a first portion having a greater steepness than a second portion, and a further spring acting on the adjustable part when disengaged, the adjustable part acting to disengage the clutch havles when the limiting torque is exceeded, means mounting the two parts for rotational movement relative to each other and a stop for limiting the rotation, a switching ring mounted on said adjustable part to be rotatably fixed and axially displaceable with respect thereto and having a switch point, a nose on the other part for interacting with the switch point to guide the parts back into engagement upon axial displacement of the switching ring.

2. A clutch as claimed in claim 1, wherein the one clutch half is rotationally fixed to the axially adjustable part of the engagement lock and comprises two clutch parts which clamp the other clutch half therebetween and a clamp spring for exerting a clamping force on the clutch parts wherein one clutch part is axially non-displaceable and the clamp spring is connected to the two clutch parts.

3. A clutch as claimed in claim 2, wherein the steepness of each of the portions is determined such that the torques for the rotation of the two parts relative to one another is essentially the same for each portion, taking into account the force of the further spring to be overcome over the first portion and the force over the second portion which is the sum of the forces of the further spring and of the clamp spring.

4. A clutch spring as claimed in claim 2, further comprising a lifting spring acting on the other clutch half in the same direction as the clamp spring.

5. A clutch as claimed in claim 4, further comprising a stop for limiting the axial movement of the one clutch half less than the total relative movement between the two clutch parts.

6. A clutch as claimed in claim 1, wherein the switch point of the switching ring has a recess for receiving the nose and wherein the switching ring and the other part are interlocked positively in the axially displaced position of the former and in the direction of rotation of the latter.

7. A clutch as claimed in claim 1, wherein the locking device of the engagement lock comprises at least one freely rotatable ball.

8. A clutch as claimed in claim 1, wherein the locking device of the engagement lock comprises at least one freely rotatable roller.

* * * * *